(12) United States Patent
Navarra Pruna

(10) Patent No.: US 9,308,681 B2
(45) Date of Patent: Apr. 12, 2016

(54) DEVICE FOR DEMOLDING PARTS

(71) Applicant: COMERCIAL DE UTILES Y MOLDES, S.A., Barcelona (ES)

(72) Inventor: Alberto Navarra Pruna, Barcelona (ES)

(73) Assignee: COMERCIAL DE UTILES Y MOLDES, S.A., Barcelona (ES)

( * ) Notice: Subject to any disclaimer, the term of this patent is extended or adjusted under 35 U.S.C. 154(b) by 0 days.

(21) Appl. No.: 14/607,506

(22) Filed: Jan. 28, 2015

(65) Prior Publication Data
US 2015/0209989 A1    Jul. 30, 2015

(30) Foreign Application Priority Data
Jan. 28, 2014    (ES) .................................. 201430098

(51) Int. Cl.
| | |
|---|---|
| *B29C 45/44* | (2006.01) |
| *B29C 45/40* | (2006.01) |
| *B29C 45/33* | (2006.01) |

(Continued)

(52) U.S. Cl.
CPC .......... *B29C 45/4005* (2013.01); *B29C 45/4421* (2013.01); *B29C 45/4435* (2013.01); *B29C 33/44* (2013.01); *B29C 45/33* (2013.01); *B29C 45/36* (2013.01); *B29C 45/76* (2013.01); *B29C 2045/4042* (2013.01);

(Continued)

(58) Field of Classification Search
CPC ...... B29C 45/4005; B29C 45/36; B29C 45/33
USPC .................................... 425/577, 556, DIG. 58
See application file for complete search history.

(56) References Cited

U.S. PATENT DOCUMENTS

| | | | | |
|---|---|---|---|---|
| 1,349,122 A | * | 8/1920 | Edlund | .......................... 164/342 |
| 5,518,679 A | * | 5/1996 | Junk | .............................. 264/318 |

(Continued)

FOREIGN PATENT DOCUMENTS

| | | |
|---|---|---|
| CN | 201989304 U | 9/2011 |
| CN | 103448217 A | 12/2013 |

(Continued)

OTHER PUBLICATIONS

The extended European search report by European patent office dated Jun. 19, 2015 for the counterpart European application No. EP 15382015.

(Continued)

*Primary Examiner* — Tim Heitbrink
(74) *Attorney, Agent, or Firm* — Michael B. Fein; Eckert Seamans Cherin & Mellott, LLC

(57) ABSTRACT

The present invention relates to a device for demolding parts, comprising a skid (1) comprising a slide (8) for housing a shaping insert (2) for molding a negative (10) of the part to be molded, said slide (8) being obliquely associated with a pushrod (9) which can move said slide (8) to an ejection position for ejecting a part to be molded, and characterized in that said pushrod (9) comprises at the upper end thereof a rack (21) meshing with another rack (22) of said slide (8), the movement of said pushrod (9) being transferred to said slide (8) through said racks (21, 22).
The invention allows reducing the volume with respect to the device described in the aforementioned document, such that it does not take up too much space when being assembled inside the shape of the mold.

10 Claims, 2 Drawing Sheets

(51) Int. Cl.
    *B29C 45/36*     (2006.01)
    *B29C 45/76*     (2006.01)
    *B29C 33/44*     (2006.01)

(52) U.S. Cl.
    CPC ............ *B29C 2945/7624* (2013.01); *B29C 2945/76083* (2013.01); *B29C 2945/76488* (2013.01)

(56) References Cited

U.S. PATENT DOCUMENTS

| | | | |
|---|---|---|---|
| 6,276,923 B1 * | 8/2001 | Shingai et al. | 425/556 |
| 2002/0122841 A1 * | 9/2002 | Joseph | 425/556 |

FOREIGN PATENT DOCUMENTS

| | | |
|---|---|---|
| DE | 2917799 B1 | 7/1980 |
| DE | 3623986 A1 | 2/1987 |
| DE | 10128875 A1 | 12/2002 |
| DE | 202004010812 U1 | 9/2004 |
| ES | 2398793 A1 | 3/2013 |
| GB | 1381114 A | 1/1975 |
| JP | S6294319 A | 4/1987 |
| JP | 2009298091 A | 12/2009 |
| JP | 2011136512 A | 7/2011 |

OTHER PUBLICATIONS

Search Report by Spanish patent office dated Oct. 10, 2014 for the counterpart Spanish application No. 201430098.

* cited by examiner

DEVICE FOR DEMOLDING PARTS

CROSS-REFERENCE TO RELATED APPLICATIONS

This application claims priority from Spanish application No. P201430098 filed Jan. 28, 2014 which is hereby incorporated by reference.

The present invention relates to a device for demolding parts which houses a shaping insert forming negatives in injection molds. It relates to a device intended for replacing current inclined skids.

BACKGROUND OF THE INVENTION

In the current field of injection molds, primarily those of considerable size (i.e., molds for the automotive sector or the like) and for obtaining plastic molded parts, the configuration of which has negative zones that cannot be molded by the conventional removal system, requires the use of skids having angular movement associated with the mold, such that the demolding of these negative portions is facilitated during the removal process.

Normally and depending on the negative to be molded, the path of these skids does not have to be the same as the path of the ejectors demolding the corresponding part. For this reason, most of these molds require using a double set of ejection plates.

These ejection plates use the same shifting movement for both groups of ejection plates, but by means of duly incorporated mechanisms, the present invention allows the first group of ejection plates to remain stationary after certain travel, while the second group continues to move to the travel limit necessary for complete removal of the molded part.

The first group of ejection plates usually incorporates all the mechanisms for angular movement, whereas the second group of ejection plates incorporates all the ejectors that enable complete ejection of the corresponding molded product.

This system, primarily brought about as a result of the effort needed to actuate one or several angular demolding elements, requires suitably sized ejection plates As they are mechanisms for angular movement, the space required for their installation in many cases makes searching for more or less burdensome alternatives necessary due to the space needed to reinforce the efforts required in each case. Consequently, larger overall mold sizes are required, with the subsequent material costs and machining hours. In many cases an injection machine with a larger capacity is also necessary due only to mold sizes and not the weight of the part.

All this considerably increases the cost of the mold and often the machines which enable machining thereof as well, which must be duly suited to these needs.

Since the molds are large, these negative portions usually also take up a significant portion of the shape to be molded, and in these cases the incorporation of cooling elements is essential to speed up cooling of the mass molded by molten plastic injection.

Therefore, the part to be demolded must be cooled before the ejection process since at the time of injection, the material enters the mold cavity in a semi-pasty state, and to be ejected through the ejectors the material must be cold and rigid.

The cooling process in plastic molds is achieved by means of internal circuits machined in the mold, through which cold water circulates, thereby achieving a jump in temperature speeding up hardening of the molded part.

The device described in document ES 2398793 A1, which belongs to the same owner as the present application and is herein incorporated as a reference, was designed to solve these problems.

The objective of the device according to the present invention with respect to the device described in said document is to reduce the volume of the device, such that it does not take up too much space when assembled inside the mold.

DESCRIPTION OF THE INVENTION

The device for demolding parts of the invention solves the mentioned drawbacks and has other advantages that will be described below.

The device for demolding parts in a mold according to the present invention comprises a skid comprising a slide for housing a shaping insert for molding a negative of the part to be molded, said slide being obliquely associated with a pushrod, being able to move said slide to an ejection position for ejecting a part to be molded, and characterized in that said pushrod comprises at the upper end thereof a rack meshing with another rack of said slide, the movement of said pushrod being transferred to said slide through said racks.

Advantageously, said skid comprises a base on which said slide slides along guides of said base which are complementary to grooves of said slide.

Said guides are preferably placed inclined with respect to the longitudinal axis of said base and are placed in a hole of said base in which said slide is housed.

Furthermore, said slide is also preferably placed inclined with respect to said pushrod.

According to a preferred embodiment, said rack of the slide is placed with its teeth perpendicular to the longitudinal axis of the slide, and the teeth of said rack of the pushrod are placed perpendicular or inclined with respect to the longitudinal axis of the pushrod.

Said pushrod preferably comprises a magnet associated with a magnetic detector for detecting the position of the pushrod.

The device for demolding parts in a mold according to the present invention the invention allows reducing the volume with respect to the device described in the aforementioned document, such that it does not take up too much space when assembled inside the shape of the mold.

BRIEF DESCRIPTION OF THE DRAWINGS

To better understand the foregoing, drawings are attached in which a practical embodiment is schematically depicted only by way of non-limiting example.

DESCRIPTION OF A PREFERRED EMBODIMENT

Figure 1:
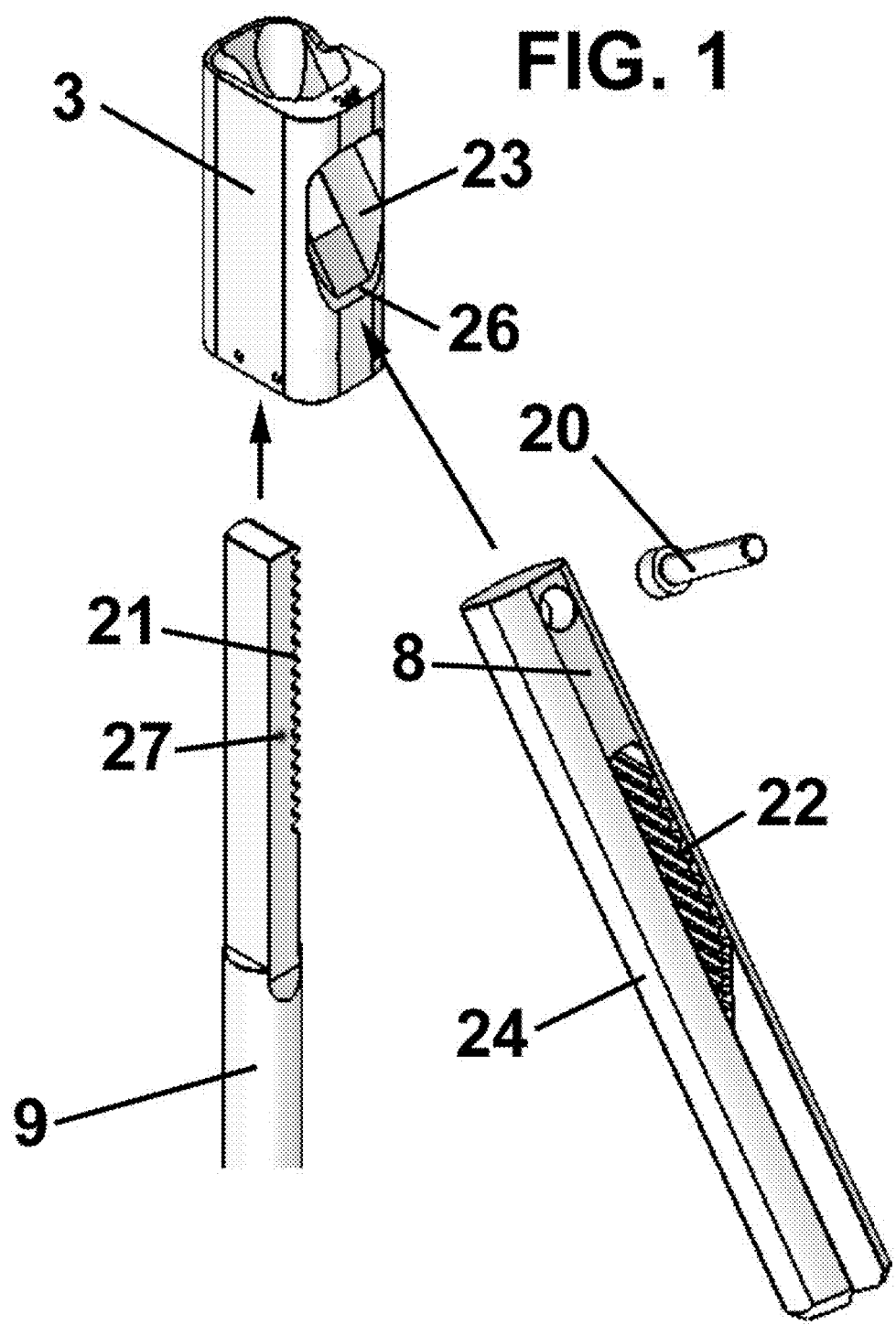
FIG. 1 is an exploded perspective view of the device for demolding parts according to the present invention.

First, it must be indicated that the device for demolding parts of the present invention is designed for use in large molds, for example in molds of more than 800 kg, such as, in a non-limiting example, for vehicle panels, vehicle doors or roofs, large household appliances, etc., where making internal negatives is necessary.

Said device for demolding parts of the present invention comprises a skid 1 provided in its upper portion with a base 3 on which a slide 8 slides. Said base 3 is attached to the mold by means of fixing screws.

Said device also comprises a shaping insert 2 removably fixed on said slide 8 by means of screws 20, which insert 2 molds a negative or projection in the desired shape. Obviously, said insert 2 can be removed and a different insert can be placed for molding a part with a different inner projection.

Said insert 2 is the element in which the shape of the negative to be reproduced in the plastic part is machined. This insert 2 can incorporate the cooling circuit most suited to its geometry to maximally optimize the cooling speed of the part to be molded.

It must be noted that in molds referred to as small molds in the art of molding, the inserts are laterally attached to the slide, i.e., the insert is placed next to the skid and not on said skid. To allow a person skilled in the art to identify the mold as a large mold, it is indicated herein that the insert is placed or fixed on the skid.

The skid 1 of the device of the present invention also comprises a pushrod 9 located in a substantially vertical manner in the mold. Said pushrod 9 moves said insert 2 between a closed position and an open or mold ejection position.

Figure 2:
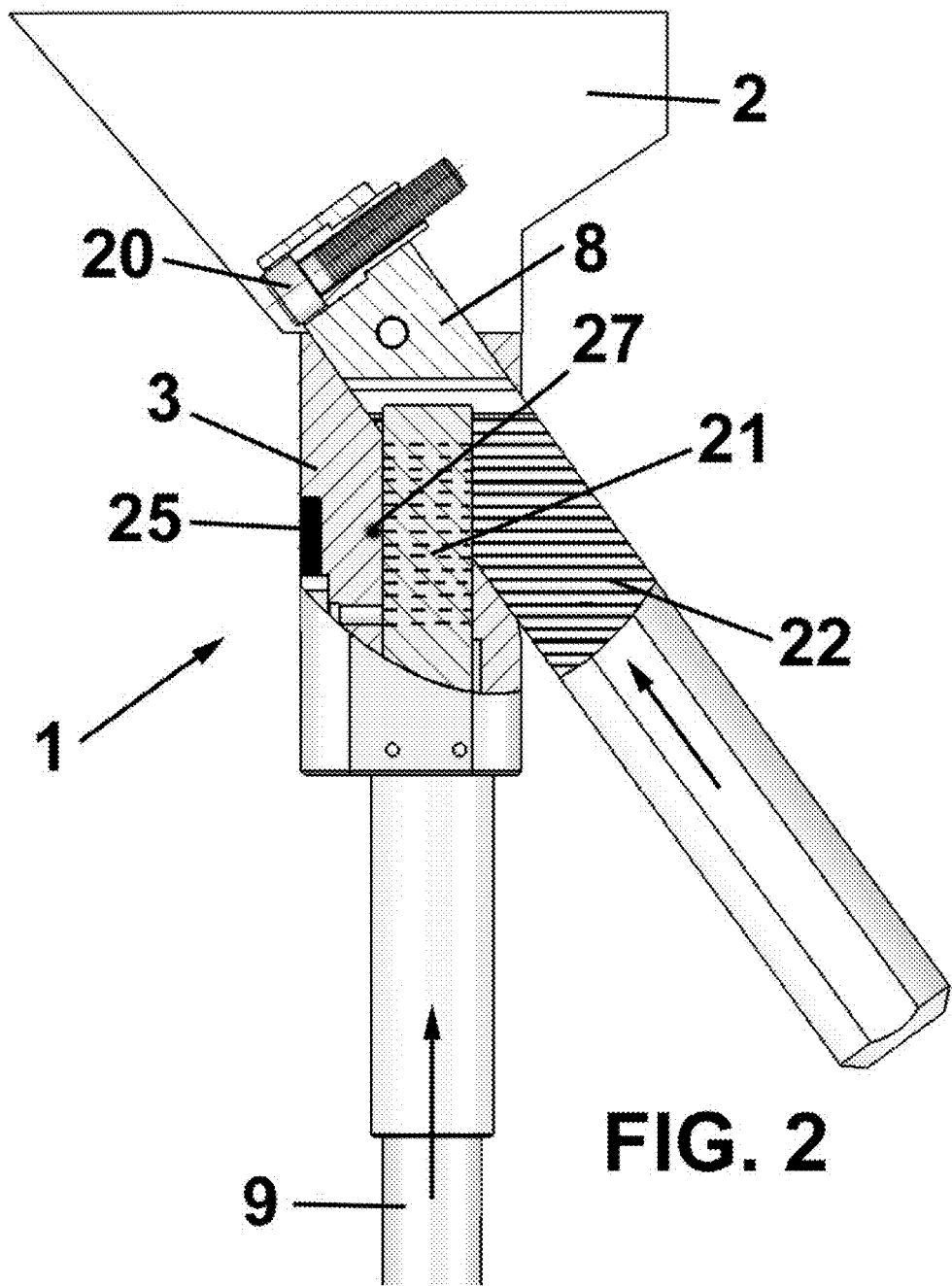
FIG. 2 is a schematic elevational view of the device for demolding parts of the present invention.

As can be seen in FIG. 2, said slide 8 is placed obliquely with respect to the pushrod 9.

According to the present invention, said pushrod 9 comprises at the upper end thereof a rack 21 meshing with another rack 22 of said slide 8, the movement of said pushrod 9 being transferred to said slide 8 through said racks 21, 22.

Due to the oblique arrangement of said slide 8 with respect to the pushrod 9, said racks 21, 22 move with respect to one another with different angles, which allows performing diverging movements in the sliding direction thereof.

The slide 8 slides along guides 23 of said base 3 which are complementary to grooves 24 of said slide 8. Said guides 23 are placed inclined with respect to the longitudinal axis of said base 3 and in a hole 26 of said base 3 in which said slide 8 is housed.

One of the racks 21 acts as a drive rack since it is coupled to the ejection plate (not depicted in the drawings) of the mold, actuating the ejection movement. The other rack 22 moves freely, such that this rack 22 moves along said guides 23 through the actuation of the drive rack 21, converting vertical movement of the rack 21 into angular movement.

The combination of the machined teeth of the racks 21, 22 determines the divergent angles of operation that must be applied in each case according to the negatives of the demolding that the actual shape to be molded may require.

As can be seen in the drawings, the rack 22 of the slide 8 is placed with its teeth perpendicular to the longitudinal axis of the slide 8, whereas the teeth of the drive rack 21 of the pushrod 9 are placed perpendicular or inclined with respect to the longitudinal axis of the pushrod 9.

Therefore, for demolding perpendicular to the mold opening and closing movement, the teeth of the drive rack 21 will be placed perpendicular with respect to the longitudinal axis of the pushrod 9 or the ejection movement, whereas the teeth of the other rack 22 will have a corresponding inclination to assure perfect sliding coupling.

For demolding with angles outside the perpendicular with respect to the mold opening and closing movement, the teeth of the drive rack 21 will be placed with the demolding angle necessary for each case, whereas the teeth of the other rack 22 will also have a corresponding inclination to assure perfect sliding coupling, but adding or subtracting the same degrees by which the molding angle is deviated outside the perpendicular.

Furthermore, said pushrod 9 also comprises a magnet 27 associated with a magnetic detector 25 for detecting the position of the pushrod 9.

Although reference has been made to a specific embodiment of the invention, it is obvious for a person skilled in the art that the device for demolding that has been described is susceptible to a number of variations and modifications, and that all the mentioned details can be replaced with other technically equivalent details, without departing from the scope of protection defined by the attached claims.

The invention claimed is:

1. A device for demolding parts in a mold, comprising a skid comprising a slide for housing a shaping insert for molding a negative of the part to be molded, said slide being obliquely associated with a vertically movable pushrod which can move said slide to an ejection position for ejecting a part to be molded, characterized in that said pushrod comprises at the upper end thereof a rack meshing directly with another rack of said slide, the movement of said pushrod being transferred to said slide through said racks.

2. The device for demolding parts in a mold according to claim 1, wherein said skid comprises a base on which said slide slides along guides of said base which are complementary to grooves of said slide.

3. The device for demolding parts in a mold according to claim 2, wherein said guides are placed inclined with respect to the longitudinal axis of said base.

4. The device for demolding parts in a mold according to claim 2, wherein said guides are placed in a hole of said base, in which said slide is housed.

5. The device for demolding parts in a mold according to claim 1, wherein said slide is placed inclined with respect to said pushrod.

6. The device for demolding parts in a mold according to claim 1, wherein said rack of the slide is placed with its teeth perpendicular to the longitudinal axis of the slide.

7. The device for demolding parts in a mold according to claim 1, wherein the teeth of said rack of the pushrod are placed perpendicular or inclined with respect to the longitudinal axis of the pushrod.

8. A device for demolding parts in a mold, comprising a skid comprising a slide for housing a shaping insert for molding a negative of the part to be molded, said slide being obliquely associated with a pushrod which can move said slide to an ejection position for ejecting a part to be molded, characterized in that said pushrod comprises at the upper end thereof a rack meshing with another rack of said slide, the movement of said pushrod being transferred to said slide through said racks, wherein said pushrod comprises a magnet associated with a magnetic detector for detecting the position of the pushrod.

9. The device for demolding parts in a mold according to claim 3, wherein said guides are placed in a hole of said base, in which said slide is housed.

10. The device for demolding parts in a mold according to claim 5, wherein said rack of the slide is placed with its teeth perpendicular to the longitudinal axis of the slide.

\* \* \* \* \*